United States Patent Office

3,269,984
Patented August 30, 1966

3,269,984
POLYMERIZATION OF HEXAORGANO-
CYCLOTRISILOXANES
Howard A. Vaughn, Jr., Scotia, N.Y., assignor to General
Electric Company, a corporation of New York
No Drawing. Filed Dec. 16, 1963, Ser. No. 330,570
6 Claims. (Cl. 260—46.5)

This invention relates to the polymerization of organopolysiloxanes. More particularly, this invention relates to the polymerization of cyclic diorganopolysiloxanes to high molecular weight viscous materials.

The polymerization of various cyclopolysiloxanes, such as cyclic polydiorganosiloxanes, is well known in the art. Such polymerization has been effected with a number of catalysts including potassium hydroxide, various potassium silanolates and materials such as quaternary ammonium and quaternary phosphonium hydroxides and alkoxides. While the polymerization of cyclopolysiloxanes to high molecular weight gummy materials can be effected by these various materials, their use involves disadvantages in some applications. For example, all of the catalytic materials previously mentioned require the use of elevated temperatures, i.e., temperatures of the order of from about 80 to 150° C. to effect the polymerization. A further disadvantage of these materials is that the residue of the catalyst or the decomposition products of the catalyst remain in the high molecular weight polydiorganosiloxane.

The present invention is based on my discovery of an improved catalyst system which avoids the disadvantages of the prior art materials. More particularly, the present invention relates to the polymerization of hexaorganocyclotrisiloxanes in which some of the silicon-bonded organo groups are lower alkyl radicals, to high molecular weight polydiorganosiloxanes having viscosities in excess of about 1,000,000 centipoises at 25° C. with a catalyst system which comprises a solution of iodine in concentrated aqueous hydriodic acid.

The use of the catalyst system comprising iodine in aqueous hydriodic acid permits the polymerization or rearrangement and condensation of hexaorganocyclotrisiloxanes to high molecular weight polydiorganosiloxanes in a short time at room temperature, i.e., a temperature of from about 20 to 25° C. Subsequent to the polymerization, the components of the catalyst system can be removed from the polymeric material by subjecting the polymeric material to a vacuum at room temperature or a moderately elevated temperature or by simply heating the polymer at an elevated temperature, e.g., from about 75 to 125° C. at atmospheric pressure for a short time. The time required for catalyst removal at elevated temperatures and atmospheric pressure is a function of the time required for diffusion of the catalyst through the polymer and can vary from a few minutes up to several hours or more, depending upon the size of the polymer mass and the degree of agitation, if any, employed. Removal of the catalyst in this fashion reduces the tendency of silicone rubber prepared from the polymeric materials to revert to the liquid state upon exposure of such silicone rubber articles to sealed, moist environments. A still further and completely unpredictable advantage of the use of the catalyst systems of the present invention is that the polymeric materials prepared by the process of the present invention contain a lower percentage of volatile materials than polymers prepared by prior art methods. For example, the polymerization of octamethylcyclotetrasiloxane to a high molecular weight polydimethylsiloxane gum in the presence of potassium hydroxide at a temperature of about 145 to 155° C. results in a polymer containing about 13% volatiles. By volatiles is meant materials which are volatilized from the decatalyzed polymer upon purging the polymer with steam. On the other hand, polymers prepared by the process of the present invention contain, on the average, less than 5% of such volatile materials.

While the catalyst composition of the present invention has been described as a solution of iodine in aqueous hydriodic acid, it is theoretically possible that the addition of the iodine to the hydriodic acid results in the formation of hydrogen triiodide, which may be the actual active component of the catalyst composition. The concentration of the aqueous hydriodic acid employed in catalyst systems of the present invention is not critical. Satisfactory catalyst compositions can be prepared from aqueous hydriodic acid solutions having concentrations as low as 5 to 10 percent hydrogen iodide. However, since the use of relatively dilute hydriodic acid causes the introduction of extraneous moisture into the reaction mixture, it is preferred to employ fairly concentrated hydriodic acid. For optimum results, the concentration of the aqueous hydriodic solution should be in the range of from about 30 to 57 percent by weight.

The iodine is present in the aqueous hydrogen iodide solution in an amount equal to from about 50 to 500 percent by weight iodine based on the weight of the hydrogen iodide in the aqueous hydrogen iodide solution. As will be discussed in more detail hereinafter, it is sometimes desirable to employ a saturated solution of iodine in a concentrated aqueous hydrogen iodide solution, which saturated solution can be prepared by merely maintaining an excess of iodine in contact with the aqueous hydrogen iodide until equilibrium is established. The amount of iodine required to saturate a commercially available 47% aqueous hydrogen iodide solution is about 200 percent by weight, based on the weight of the concentrated hydrogen iodide at a temperature of 25° C.

As previously mentioned, the cyclopolysiloxanes which are employed in the practice of the present invention are hexaorganocyclotrisiloxanes in which at least some of the silicon-bonded organic groups are lower alkyl radicals. These cyclotrisiloxanes include many materials which are well known in the art as well as certain other special types of cyclotrisiloxanes. In the organocyclotrisiloxanes employed in the practice of the present invention, the organo groups are attached to the silicon atom through silicon-carbon linkages. These materials can be described as having the following formula:

(1) 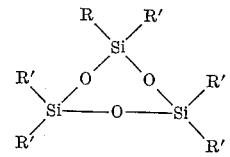

where R is a lower alkyl radical and each of the R' groups is a member selected from the class consisting of monovalent hydrocarbon radicals free of aliphatic unsaturation and halogenated monovalent hydrocarbon radicals free of aliphatic unsaturation.

The lower alkyls represented by R contain from one to eight carbon atoms. The preferred R radical is methyl. Among the many radicals represented by R' in Formula 1 can be mentioned, for example, alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; cycloaliphatic radicals, e.g., cyclohexyl, cycloheptyl, etc. radicals; and halogenated radicals, e.g., chloromethyl, chloroethyl, trifluoropropyl, chlorophenyl, dibromophenyl, trifluoromethylphenyl, tetrachlorophenyl, etc. radicals. The preferred radicals represented by R' are methyl and phenyl radicals, with the preferred specific radical represented by R' being the methyl radical.

Illustrative of specific cyclotrisiloxanes within the scope of Formula 1 are, for example, hexamethylcyclotrisiloxane, sym-trimethyltriphenylcyclotrisiloxane, methylpentaphenylcyclotrisiloxane, 1,1-dimethyl-tetraphenylcyclotrisiloxane, etc.

While methods for preparing most of the cyclotrisiloxanes described above and all of the others within the scope of Formula 1 are generally well known in the art, it may be advantageous to a person skilled in the art to provide a brief description of a method of preparing those cyclotrisiloxanes within the scope of Formula 1 which contain two diphenylsiloxane units. Such materials can be prepared by effecting reaction in the presence of pyridine between tetraphenyldisiloxanediol-1,3 and an alkylorganodichlorosilane having the formula:

(2)  (R)(R')SiCl$_2$ where R and R' are as previously defined.

The polymerization reaction of the present invention is initiated by merely bringing into contact the cyclotrisiloxane of Formula 1, the concentrated hydriodic acid and the iodine in any suitable fashion. In one embodiment of my invention, the iodine is uniformly mixed with the cyclotrisiloxane and the concentrated hydriodic acid is added and uniformly dispersed in the reaction mixture. In the preferred embodiment of my invention, a saturated solution of iodine in the concentrated hydriodic acid is formed and the saturated solution is added to the cyclotrisiloxane and uniformly mixed therewith. Since the cyclotrisiloxanes of Formula 1 are solid materials, it is obvious that care should be exercised to insure a uniform mixture of the cyclotrisiloxane with the components of the catalyst composition.

The time required for effecting the rearrangement and condensation of the cyclotrisiloxane to a high molecular weight polydiorganosiloxane is a function of the particular cyclotrisiloxane employed and the amount of catalyst employed, as well as the particular procedure employed for effecting the reaction. With all other things being equal, hexamethylcyclotrisiloxane is converted to a high molecular weight gum much more rapidly than are other cyclotrisiloxanes within the scope of Formula 1. Finally, the rate of reaction increases with increased catalyst concentration up to a point.

The concentration of catalyst employed in the practice of the present invention can vary within extremely wide limits with satisfactory reaction being obtained when the catalyst is present in the amount of from about 10 to 10,000 parts total iodine per million parts of the cyclotrisiloxane of Formula 1. Total iodine is all of the iodine, regardless of chemical state, added to the cyclotrisiloxane. Preferably, the amount of catalyst employed is sufficient to provide from about 500 to 5,000 parts total iodine per million parts of the cyclotrisiloxane. With amounts of catalyst in the preferred range, rearrangement and condensation of cyclotrisiloxanes to high molecular weight polydiorganosiloxanes can be effected in times which vary from as low as 10 minutes to as much as two days or more at room temperature. As the temperature of the reaction increases, the rate of reaction increases.

After the conversion of the cyclotrisiloxane to the high molecular weight polydiorganosiloxane gum, the gum is inactivated as previously described. Generally, pressures of the order of from 1 micron to 50 mm. Hg are employed and the time required to remove the components of the catalyst composition can vary from several minutes to 24 hours or more, depending upon the pressure and temperature employed.

The catalyst compositions of the present invention are unique in that they are operative only with respect to certain types of cyclopolysiloxanes and in that the omission of one component of the catalyst composition either destroys the effectiveness of the composition or impairs such effectiveness. More particularly, it has been found that the catalyst compositions described above are ineffective for the rearrangement and condensation of cyclotetrasiloxanes. Thus, these catalyst compositions have been ineffective in converting octamethylcyclotetrasiloxane, octaphenylcyclotetrasiloxane, sym-tetramethyltetraphenylcyclotetrasiloxane, 1,1 - dimethylhexaphenylcyclotetrasiloxane or 1,1,5,5-tetramethyltetraphenylcyclotetrasiloxane to the gum state. Likewise, these catalyst compositions have been ineffective in converting hexaphenylcyclotrisiloxane to a gum. Furthermore, the use of iodine alone or a mixture of iodine and water has been unsatisfactory to cause conversion of compounds such as hexamethylcyclotrisiloxane to a gum. Also of reduced effectiveness in causing polymerization of hexamethylcyclotrisiloxane is concentrated hydriodic acid alone without iodine.

While the foregoing description has been directed to the polymerization of cyclotrisiloxanes in the solid form, it should also be understood that within the scope of the present invention is the polymerization of the cyclotrisiloxanes in liquid form or in solution. For example, a given cyclotrisiloxane can be heated to a temperature above its melting point and the catalyst composition added. As the resultant reaction mixture cools, the catalyst causes polymerization of the cyclotrisiloxane to a gum. The polymer prepared from the molten cyclotrisiloxane is decatalyzed in the same method as that prepared from the solid material.

A still further technique for employing the catalysts of the present invention is to form a solution of the cyclotrisiloxane of Formula 1 and then add the catalyst composition to the resulting solution. The nature of the solution of the cyclotrisiloxane is completely immaterial to the present invention. Any solvent which is a solvent for the cyclotrisiloxane and which is inert to the reactants under the conditions of the reaction can be employed. Suitable solvents include, for example, benzene, toluene, and the conventional mineral spirits. The amount of solvent employed can also vary within wide limits with the amount of solvent employed varying from the minimum amount necessary to dissolve the cyclotrisiloxane up to large excesses. Where a solvent is employed for the cyclotrisiloxane, the solvent is removed from the resulting polymer during the same operation in which the catalyst composition is removed.

The polydiorganosiloxane gums prepared by the process of the present invention have the same utility as those prepared by prior art processes. For example, these gums can be compounded with various fillers, such as finely divided silica fillers, and suitable catalysts, such as, for example, benzoyl peroxide, and press-cured to the desired shape or extruded into the desired shape. Thus, the silicone rubbers prepared from polydiorganosiloxane gums prepared by the process of the present invention can be employed as insulation for electrical conductors, as cushioning means, as gaskets and seals and the like.

The following examples are illustrative of the practice of the present invention and are not intended for purposes of limitation. All parts are by weight.

*Example 1*

To a reaction vessel was added 100 parts of hexamethylcyclotrisiloxane and 0.25 part of a solution of 2.50 parts of iodine in 2.68 parts of 47% hydriodic acid. The iodine and hydriodic acid were mixed as uniformly as possible with the solid hexamethylcyclotrisiloxane. After the addition of the iodine and hydriodic acid to the cyclotrisiloxane, the resulting material was a brownish mass which slowly lost its crystalline nature and turned into a high viscosity purple gum by the end of 16 hours. Thereafter, the polymer was maintained at room temperature at a pressure of 10 microns for 30 hours, during which time volatiles were removed and the gum lost its color. This resulting gum had a viscosity of more than 100,000,000 centipoises at 25° C. A silicone rubber was prepared by mixing 1.0 part of this gum with 0.4 part of fumed silica and 0.04 part benzoyl peroxide. The reaction mixture was then heated at a temperature of 150° C. for 10 minutes, during which time the mixture was converted to a solid, elastic silicone rubber.

*Example 2*

To a reaction vessel was added 6 parts of hexamethylcyclotrisiloxane and .03 part of iodine. The iodine was thoroughly mixed with the powdered cyclotrisiloxane and then .05 part of 47% hydriodic acid was added and thoroughly mixed with the other components. Within 5 hours, this reaction mixture had been converted to a high molecular weight polydimethylsiloxane gum having a viscosity in excess of 20,000,000 centipoises at 25° C. This reaction mixture was heated at a temperature of 40° C. at a pressure of 0.1 millimeter for 24 hours, during which time all unreacted catalyst was removed and the gum was converted from its purple color to a clear material. A silicone rubber was formed of this material in the same manner as was done with the gum of Example 1.

*Example 3*

To 3 parts of 1,1-dimethyltetraphenylcyclotrisiloxane was added 0.02 part of a saturated solution prepared by dissolving 15.77 grams iodine in 7.75 grams of a 47% aqueous hydriodic acid solution. After stirring this mixture for several minutes to form a uniform dispersion of the catalyst composition on the solid cyclotrisiloxane, the reaction mixture was left at room temperature. After several days, the cyclotrisiloxane had been converted to a gum which was maintained at a temperature of 25° C. at a pressure of 0.1 millimeter to remove catalyst, producing a clear diorganopolysiloxane gum having a viscosity in excess of 1,000,000 centipoises at 25° C. and which could be converted to a silicone rubber by high energy electron irradiation.

*Example 4*

To 5 parts of hexamethylcyclotrisiloxane dissolved in 2.64 parts of benzene was added 0.020 part of a solution prepared by dissolving 15.77 parts of iodine in 7.75 parts of 47% aqueous hydriodic acid. Within 10 minutes the hexamethylcyclotrisiloxane had polymerized to a high molecular weight. After 18 hours at room temperature, a portion of this gum was devolatilized and decatalyzed by heating as a thin film for one hour at 100° C. in an air circulating oven. The resulting material had an intrinsic viscosity of 0.7 deciliter per gram, which corresponds to a viscosity far in excess of 1,000,000 centipoises.

*Example 5*

To 5 parts of hexamethylcyclotrisiloxane in a reaction vessel was added 0.020 part of a solution prepared by saturating 28.5% aqueous hydriodic acid with iodine. Within 18 hours, this material had polymerized to a polydimethylsiloxane gum having a viscosity in excess of 1,000,000 centipoises.

*Example 6*

To 5 parts hexamethylcyclotrisiloxane was added 0.03 part of a solution made by saturating 16% aqueous hydriodic acid with iodine. This reaction mixture was warmed to about 35° C. and then allowed to cool to room temperature. Within 30 minutes, the material had polymerized to a high molecular weight material and at the end of 16 hours, the material had polymerized to a firm polydimethylsiloxane gum having a viscosity in excess of 10,000,000 centipoises when measured at 25° C.

While the foregoing examples have illustrated a number of embodiments of my invention, it should be understood that my invention is broadly applicable to the use of a catalyst composition comprising iodine and concentrated hydriodic acid for the rearrangement and condensation of hexaorganocyclotrisiloxanes to high molecular weight polydiorganosiloxane gums where at least one of the organo groups of the hexaorganocyclotrisiloxane is a silicon-bonded methyl group.

What I claim as new and desire to secure by Letters Patent of the United States is:

1. The process for preparing a high molecular weight polydiorganosiloxane which comprises forming a reaction mixture of (a) a cyclotrisiloxane having the formula:

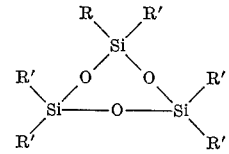

where R is a lower alkyl radical and R' is a member selected from the class consisting of monovalent hydrocarbon radicals free of aliphatic unsaturation and halogenated monovalent hydrocarbon radicals free of aliphatic unsaturation, (b) iodine and (c) aqueous hydriodic acid, maintaining the components of said reaction mixture in contact with each other until said cyclotrisiloxane has been converted to a high molecular weight polydiorganosiloxane and recovering said high molecular weight polydiorganosiloxane.

2. The process of claim 1 in which said cyclotrisiloxane is hemamethylcyclotrisiloxane.

3. The process of claim 1 in which said cyclotrisiloxane is 1,1-dimethyltetraphenylcyclosiloxane.

4. The process for preparing a high molecular weight polydiorganosiloxane which comprises forming a reaction mixture of (a) a cyclotrisiloxane having the formula:

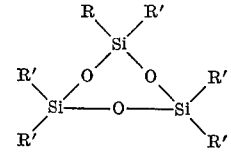

where R is a lower alkyl radical and R' is a member selected from the class consisting of monovalent hydrocarbon radicals free of aliphatic unsaturation and halogenated monovalent hydrocarbon radicals free of aliphatic unsaturation, (b) iodine and (c) aqueous hydriodic acid and maintaining the components of said reaction mixture in contact with each other until said cyclotrisiloxane has been converted to a high molecular weight polydiorganosiloxane, said reaction mixture containing from about 10 to 10,000 parts by weight total iodine per million parts of said cyclotrisiloxane, said aqueous hydriodic acid having a concentration of from about 30 to 57 percent by weight, and said iodine being present in an amount equal to about 50 to 500 percent by weight based on the weight of the hydrogen iodide in said aqueous hydriodic acid.

5. The process of claim 4 in which said cyclotrisiloxane is hexamethylcyclotrisiloxane.

6. The process of claim 4 in which said cyclotrisiloxane is 1,1-dimethyltetraphenylcyclotrisiloxane.

References Cited by the Examiner

UNITED STATES PATENTS

| 2,759,008 | 8/1956 | Dunham et al. | 260—46.5 |
| 2,891,920 | 6/1959 | Hyde et al. | 260—46.5 |
| 3,132,167 | 5/1964 | Boot et al. | 260—46.5 |

FOREIGN PATENTS 832,489   4/1960   Great Britain.

OTHER REFERENCES

Powell et al.: J.A.C.S., vol. 69 (May 1947), pages 1227–28.

Jacobson: Encyclopedia of Chemical Reactions, vol. III, page 709 (1949).

LEON J. BERCOVITZ, *Primary Examiner.*

M. I. MARQUIS, *Assistant Examiner.*